(12) United States Patent
Ruhlander

(10) Patent No.: US 7,752,941 B2
(45) Date of Patent: Jul. 13, 2010

(54) TERMINAL CONNECTORS AND TERMINAL CONNECTOR ASSEMBLIES

(75) Inventor: Gregory Phillip Ruhlander, Hannibal, MO (US)

(73) Assignee: Dura Global Technologies, Inc., Rochester Hills, MI (US)

(*) Notice: Subject to any disclaimer, the term of this patent is extended or adjusted under 35 U.S.C. 154(b) by 1617 days.

(21) Appl. No.: 10/828,385

(22) Filed: Apr. 20, 2004

(65) Prior Publication Data

US 2005/0186024 A1 Aug. 25, 2005

Related U.S. Application Data

(60) Provisional application No. 60/546,726, filed on Feb. 23, 2004.

(51) Int. Cl.
*F16C 1/26* (2006.01)
(52) U.S. Cl. .................................. 74/502.6
(58) Field of Classification Search ............. 74/500.5, 74/502.4, 502.6, 503
See application file for complete search history.

(56) References Cited

U.S. PATENT DOCUMENTS

| | | | |
|---|---|---|---|
| 3,631,738 A | | 1/1972 | Harper |
| 4,339,213 A | | 7/1982 | Gilmore |
| 4,380,178 A | * | 4/1983 | Bennett et al. .......... 74/502.4 |
| 4,682,513 A | * | 7/1987 | Reeder .................. 206/223 |
| 4,951,524 A | | 8/1990 | Niskanen |
| 5,039,138 A | * | 8/1991 | Dickirson ............... 285/314 |
| 5,127,852 A | | 7/1992 | Cravens et al. |
| 5,347,882 A | | 9/1994 | Klotz |
| 5,383,377 A | * | 1/1995 | Boike .................... 74/502 |
| 5,448,926 A | * | 9/1995 | Reasoner ............... 74/500.5 |
| 5,553,818 A | | 9/1996 | Wild |
| 5,564,314 A | | 10/1996 | Gabas |
| 5,570,611 A | * | 11/1996 | Pospisil et al. .......... 74/502.6 |
| 5,596,908 A | | 1/1997 | Hall |
| 5,884,531 A | | 3/1999 | Koenig |

(Continued)

FOREIGN PATENT DOCUMENTS

DE 29700019 U1 2/1997

(Continued)

OTHER PUBLICATIONS

International Search Report for PCT/US05/05723.

(Continued)

*Primary Examiner*—Vicky A Johnson
(74) *Attorney, Agent, or Firm*—Banner & Witcoff Ltd; Peter D. McDermott; Dean B. Watson

(57) ABSTRACT

Novel terminal connectors or fittings and terminal connector assemblies using such novel terminal connectors are disclosed. The terminal connector assemblies have uses which include, for example, on load- or motion-transmitting cable assemblies, e.g., for aircraft, automotive, and marine vehicle applications. Certain exemplary embodiments of the terminal connectors and terminal connector assemblies have features that, either alone or in combination, provide desirable characteristics such as, e.g., reduced lash or vibration in such cable assemblies. Such features include, but are not limited to groove(s) disposed in an arm of the fitting, tab member(s) extending from an arm of the terminal connector, projection(s) positioned on an arm of the fitting, etc.

17 Claims, 11 Drawing Sheets

U.S. PATENT DOCUMENTS

| | | | | | |
|---|---|---|---|---|---|
| 5,911,790 | A | * | 6/1999 | Bates et al. | 74/502.4 |
| 6,056,020 | A | * | 5/2000 | Malone | 138/155 |
| 6,209,414 | B1 | * | 4/2001 | Uneme | 74/502.4 |
| 6,748,820 | B2 | * | 6/2004 | Ruhlander | 74/502.4 |
| 2002/0189390 | A1 | * | 12/2002 | Mayville et al. | 74/502.6 |
| 2004/0149480 | A1 | | 8/2004 | Ball | |

FOREIGN PATENT DOCUMENTS

| | | |
|---|---|---|
| EP | 0223470 A | 5/1987 |
| EP | 0365243 A | 4/1990 |
| EP | 0678680 A | 10/1995 |
| EP | 0942185 A | 9/1999 |
| EP | 1291536 A | 3/2003 |
| FR | 2841614 A | 1/2004 |
| FR | 2841614 A1 | 1/2004 |
| GB | 1216439 A | 12/1970 |
| JP | 2000039016 A | 2/2000 |
| JP | 2000039016 A | 9/2000 |

OTHER PUBLICATIONS

Drawing entitled, Slide-N-Snap Fitting—Shift End:, Production No. 53 1345 3300.

Drawiing entitled,"Slide-N-Snap Fitting", Production No. 53 1345 3090.

European Search Report EP 0525523.8 A.

European Search Report for EP 05713974.

Office Action from Chinese Patent Office, for corresponding Chinese Patent Application No. 200580004983.5.

Official Action from corresponding Mexican Application No. PA/A/2006/009298.

* cited by examiner

TERMINAL CONNECTORS AND TERMINAL CONNECTOR ASSEMBLIES

PRIORITY APPLICATION

This application claims the benefit of U.S. Provisional Application No. 60/546,726 filed on Feb. 23, 2004 and titled "Terminal Connectors and Terminal Connector Assemblies."

TECHNICAL FIELD

This disclosure relates to motion-transmitting cable assemblies and to terminal or rod-end assemblies for such cable assemblies.

BACKGROUND

Motion-transmitting cable assemblies, such as "push-pull cables," are used for transmitting force or load and/or motion, typically along a curved path, e.g., in aircraft, automotive and marine environments, etc. Such cable assemblies are useful, for example, as remote control cable assemblies. In the automotive environment, for example, typical applications include parking brake cables, accelerator cables, hood release cables, brake release cables, trunk release cables, park lock cables, tilt wheel control cables, fuel filler door cables, transmission shifter cables, hydraulic control cables, and other applications.

Certain types of motion-transmitting cable assemblies for transmitting force or motion along a curved path employ a flexible core element (sometimes referred to as the core or strand) slidably enclosed within a flexible outer sheath (sometimes referred to as the conduit) with a fitting attached to each end. Each such end fitting attaches, or is adapted to be attached, to a corresponding mounting fixture, such as a bracket, base, support structure or the like. More specifically, the cable assembly includes, typically, a terminal connector assembly (alternatively referred to herein as terminal assembly or rod-end assembly or the like) at one end or at both ends, comprising a fitting (alternatively referred to herein as a connector, terminal connector, terminal sub-assembly or the like). Moving the actuator member transmits force/motion via longitudinal movement of the strand within the sheath, to correspondingly move the controlled member. Routinely, a first terminal connector assembly at one end of the cable, incorporating a fitting or terminal sub-assembly is secured (or adapted to be secured) to a controlled member, e.g., a movable lever or the like of a motor vehicle transmission, and a second terminal connector assembly at the other end of the cable, incorporating a second fitting (which may or may not be identical to the fitting at the first end) is secured (or adapted to be secured) to an actuator, i.e., a control member, e.g., a shift lever of a motor vehicle transmission shifter, a handle, motor output member, etc. Typically, the actuator member and the controlled member each provides, as mentioned above, a mounting fixture which may comprise, e.g., a pin, socket or other suitable feature at a mounting point for connection to the corresponding feature of the fitting of the terminal connector assembly, such that the cable assembly is able to transfer load or motion between the two mounting points.

The connection of a motion-transmitting cable assembly to a mounting fixture or other attachment component at the aforesaid mounting point of a controlled or control member by a terminal connector assembly is frequently an imperfect connection, that is, the parts do not assemble together with the correct fit. There may, for example, be relatively large manufacturing tolerances resulting in a range of dimensional variations in the components. Manufacturing tolerance may stack-up, i.e., be additive with one another. Imperfect fit may be seen, for example, in the attachment fixtures of automobile transmission shift systems. As a result of this or other reasons, there can be a difference in fit from one unit to the next, between the terminal connector assembly and the mounting fixture, which in some units results in a gap and the possibility of lash, i.e., relative movement between the fitting and the pin. In certain cases lash causes inaccuracy in the transmission shift system throughout its range of movement.

For these and other reasons, terminal connector assemblies may have undesirably large installation loads, i.e., undesirably large forces may be required to attach the terminal connector to the pin, socket or other such feature of the mounting fixture. Similarly, undesirably high extraction loads, the force required to remove the terminal connector from the mounting fixture, may be required. It is desireable to better control the amount of installation and/or extraction force required for installing and extracting a terminal connector. It is further desireable to better control such installation and/or extraction force while minimizing lash.

It is, therefore, an object of the present disclosure to provide improved terminal connectors and terminal connector assemblies. In accordance with certain exemplary embodiments, terminal connectors and terminal connector assemblies have improved installation and/or extraction forces. In accordance with certain exemplary embodiments, terminal connectors and terminal connector assemblies provide connections with reduced lash and reduced inaccuracy in the transmission of movements or loads. Additional features and advantages will be apparent to those skilled in this technology area given the benefit of this disclosure.

SUMMARY

In accordance with a first aspect, a terminal connector or fitting for a terminal connector assembly for a cable assembly comprises an elongate body, with a longitudinal bore disposed through such elongate body. A first arm having a proximal end and a distal end is unitary with and extends from the elongate body in a plane. A projection, referred to in some cases as a first projection, protrudes from a surface of the first arm. A second arm having a proximal end and a distal end also is unitary with and extends from the elongate body in a plane. A second projection protrudes from a surface of the second arm. The first projection and the second projection each is configured to be connected to a mounting fixture, e.g., to be received in a corresponding aperture in a base or bracket. Certain exemplary embodiments of such terminal connectors (also referred to as fittings in some cases, as mentioned above) are suitable for use in remote control cable assemblies.

Certain exemplary embodiments of such terminal connectors or fittings are suitable for use in force-transmitting (that term meaning also motion-transmitting) cable assemblies in which the amount of installation and/or extraction loads, as the case may be, can be controlled or adjusted. In certain exemplary embodiments of such fittings the amount of force required for installation and/or extraction is within an advantageous range. In certain exemplary embodiments of such fittings the amount of force required for installation and/or extraction can be controlled or adjusted. In certain embodiments, lash (i.e., relative movement between the fitting and the mounting fixture) is reduced through use of an isolator, as discussed in greater detail below.

Certain exemplary embodiments of the terminal connectors disclosed here have advantageous flexure of the first arm and the second arm relative to the longitudinal axis of the bore in the elongate body. Certain such embodiments have a first groove disposed in and extending across the first arm and a second groove disposed in and extending across the second arm.

In accordance with another aspect, a terminal connector assembly comprises:

a terminal connector as disclosed above, wherein the elongate body has an abutment end, a swivel tube having an end and a cable receiving bore, the end extending into the abutment end of the fitting;

a molded sleeve extending at least partially into the free end of the fitting;

an isolator material; and a cover mounted to the free end of the fitting and longitudinally capturing the molded sleeve and the isolator material to the fitting.

As mentioned above, it is advantageous to control the amount of insertion and/or extraction loads or forces necessary for inserting or extracting, as the case may be, a terminal connector assembly to or from a mounting fixture. Certain exemplary embodiments in accordance with the present disclosure provide novel features for controlling such required insertion and/or extraction forces, which may be used either alone or in combination with each other. Certain exemplary embodiments provide reduced insertion and/or extraction forces.

In accordance with another aspect, a remote control cable assembly for operator control of a motor vehicle transmission comprises a shifter end terminal connector assembly, a transmission end terminal connector assembly and a conduit connecting the shifter end terminal connector assembly with the transmission end terminal connector assembly. The shifter end terminal connector assembly comprises a fitting comprising an elongate body having an abutment end, a free end, and a longitudinal bore disposed therethrough, a first arm unitary with and extending from the elongate body in a plane and having a first projection protruding from a surface of the first arm, and a second arm unitary with and extending from the elongate body in a plane and having a second projection protruding from a surface of the second arm, a swivel tube having an end and a cable receiving bore, the end extending into the abutment end of the fitting, a molded sleeve extending at least partially into the free end of the fitting, an isolator material, and a cover mounted to the free end of the fitting and longitudinally capturing the molded sleeve and the isolator material to the fitting. The transmission end terminal connector assembly comprises a fitting comprising an elongate body having an abutment end, a free end, and a longitudinal bore disposed therethrough, a first arm unitary with and extending from the elongate body in a plane and having a first projection protruding from a surface of the first arm, and a second arm unitary with and extending from the elongate body in a plane and having a second projection protruding from a surface of the second arm, a swivel tube having an end and a cable receiving bore, the end extending into the abutment end of the fitting, a molded sleeve extending at least partially into the free end of the fitting, an isolator material, a cover mounted to the free end of the fitting and longitudinally capturing the molded sleeve and the isolator material to the fitting.

Certain exemplary embodiments of cable assemblies in accordance with the present disclosure are well adapted to accommodate manufacturing tolerances stack-up, as experienced in typical push-pull cable systems. Certain exemplary embodiments have an adjuster assembly comprising an aperture disposed in the abutment end of the elongate body of the terminal connector and a flexible projection substantially disposed in the aperture. the flexible projection having an exterior surface being substantially flush with the exterior surface of the abutment end.

Additional aspects and features of the inventive subject matter disclosed here will be apparent to those skilled in the art, that is, to those who are knowledgeable and experienced in this area of technology, from the following discussion of certain exemplary embodiments.

BRIEF DESCRIPTION OF THE DRAWINGS

Certain embodiments are described below with reference to the accompanying figures in which:

FIG. 5b is a reverse perspective view of the fitting of FIG. 5a.

Figure 1:
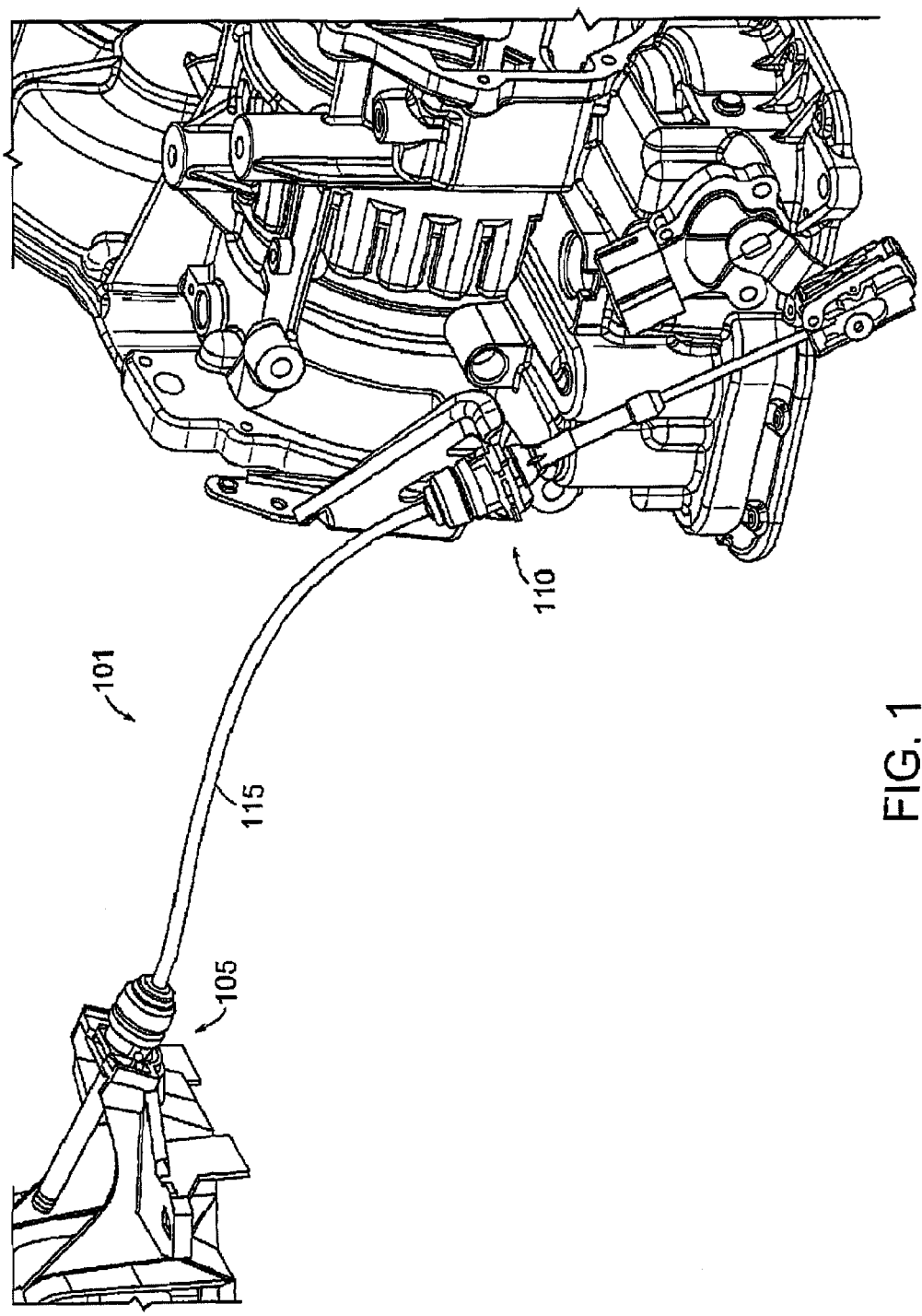
FIG. 1 is a perspective view of a remote control cable assembly comprising terminal connector assemblies with terminal connectors in accordance with certain embodiments of the present invention, wherein a first terminal connector assembly is mounted to an automobile transmission shifter and a second terminal connector assembly is mounted to a transmission assembly.

It should be understood that the appended drawings are not necessarily to scale, presenting a somewhat simplified representation of various features illustrative of the basic principles described here. The specific design features of the terminal connectors and associated assemblies disclosed here, including, for example, specific dimensions, orientations, and shapes of the arms, grooves, tab members, projections, etc. will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the terminal connectors and associated assemblies illustrated in the drawings.

DETAILED DESCRIPTION OF CERTAIN EXEMPLARY EMBODIMENTS

Although specific examples of terminal connectors and assemblies are now described with reference to the drawings, it should be understood that such examples are merely illustrative of the numerous possible embodiments suitable for various different specific applications. Thus, for example, movement of the actuator member and the controlled member may the same or different, and may be rotational, longitudinal or other type of movement. In certain exemplary embodiments, for example, the control member and the controlled member may from time to time reverse roles or may otherwise share the control and controlled roles. It will be within the ability of those skilled in the art to apply the principles disclosed here to design embodiments of the invention suitable for such various different specific applications. Thus, various changes and modifications will be obvious to one skilled in the art in view of the present disclosure and are within the spirit and scope of the present disclosure as defined in the appended claims, below.

The terms "a," "an," and "the" as used herein are defined to mean "one or more" and include the plural unless a contrary meaning is made clear from the particular context. Similarly, certain features of the terminal connectors or fittings and their associated assemblies may be referred to in the appended claims in the singular, however, unless a contrary meaning is made clear from the particular context, such references do not necessarily exclude the correlative plural. For example, the term a "groove" means one or more grooves unless a contrary meaning is made clear from the particular context. Similarly, the term an "arm" means one or more arms unless a contrary meaning is made clear from the particular context.

Referring now to the drawings, FIG. 1 shows an embodiment of a remote control cable assembly having a terminal connector for a transmission system of a motor vehicle, such as an automobile, truck, bus, van, recreational vehicle, earth moving equipment, off road vehicle, air borne vehicle, and water borne vehicle or the like. While the illustrated embodiments are particularly adapted for use with a transmission shift assembly, it is also noted that the presently disclosed terminal connectors and terminal connector assemblies can be utilized in other motor vehicle systems such as, for example, parking brake cables, accelerator cables, hood release cables, brake release cables, trunk release cables, park lock cables, tilt wheel control cables, fuel filler door cables, transmission shifter cables, hydraulic control cables, and other applications.

The remote control cable assemblies disclosed here can, at least in certain embodiments, have more than one terminal connector assembly. For example, the remote control cable assembly 101 shown in FIG. 1 has two terminal connector assemblies 105, 110 connected to each other by a control cable 115. In certain embodiments, the control cable 115 comprises a flexible sleeve surrounding a conduit, which in turn surrounds an inner core (not shown). The first assembly 105 is shown mounted to a shifter end of the remote control cable assembly. The second assembly 110 is shown to be proximal to a transmission assembly end of the remote control cable assembly. Additional terminal connector assemblies can be added to the remote control cable assembly shown in FIG. 1 as desired, depending on the particular application intended. Alternatively, in certain embodiments, only a single terminal connector assembly is used in a remote control cable assembly. In accordance with such embodiments, the single terminal connector assembly is positioned at either the controlled end or the control end of the remote control cable assembly. Suitable location and positioning of the terminal connector assemblies disclosed here will be readily apparent to those of skill in the art given the benefit of this disclosure.

Figure 2:
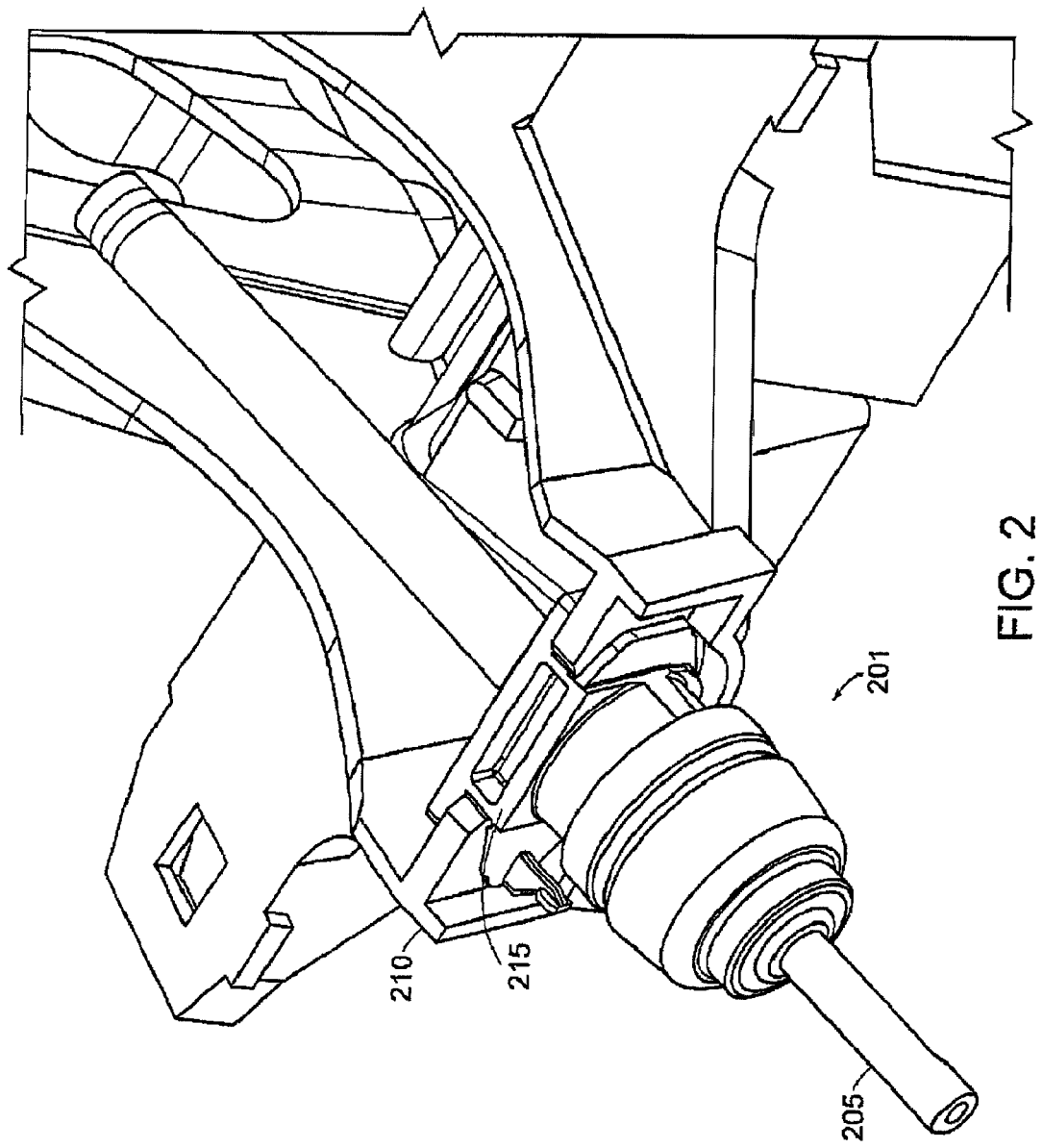
FIG. 2 is a perspective view of an automobile transmission shifter base with a terminal connector assembly having a fitting in accordance with certain embodiments of the present disclosure.

FIG. 2 shows an embodiment of a shifter end terminal connector assembly 201 of a remote control cable assembly for a transmission shift assembly. The remote control cable assembly includes a conduit member 205 and a flexible inner core or strand member (not shown) longitudinally slidable within the conduit member. The conduit member 205 is secured to a structure or base 210, specifically, to a transmission shifter base, by a terminal connector 215 in accordance with an exemplary embodiment of the fixtures disclosed here.

Figure 3:
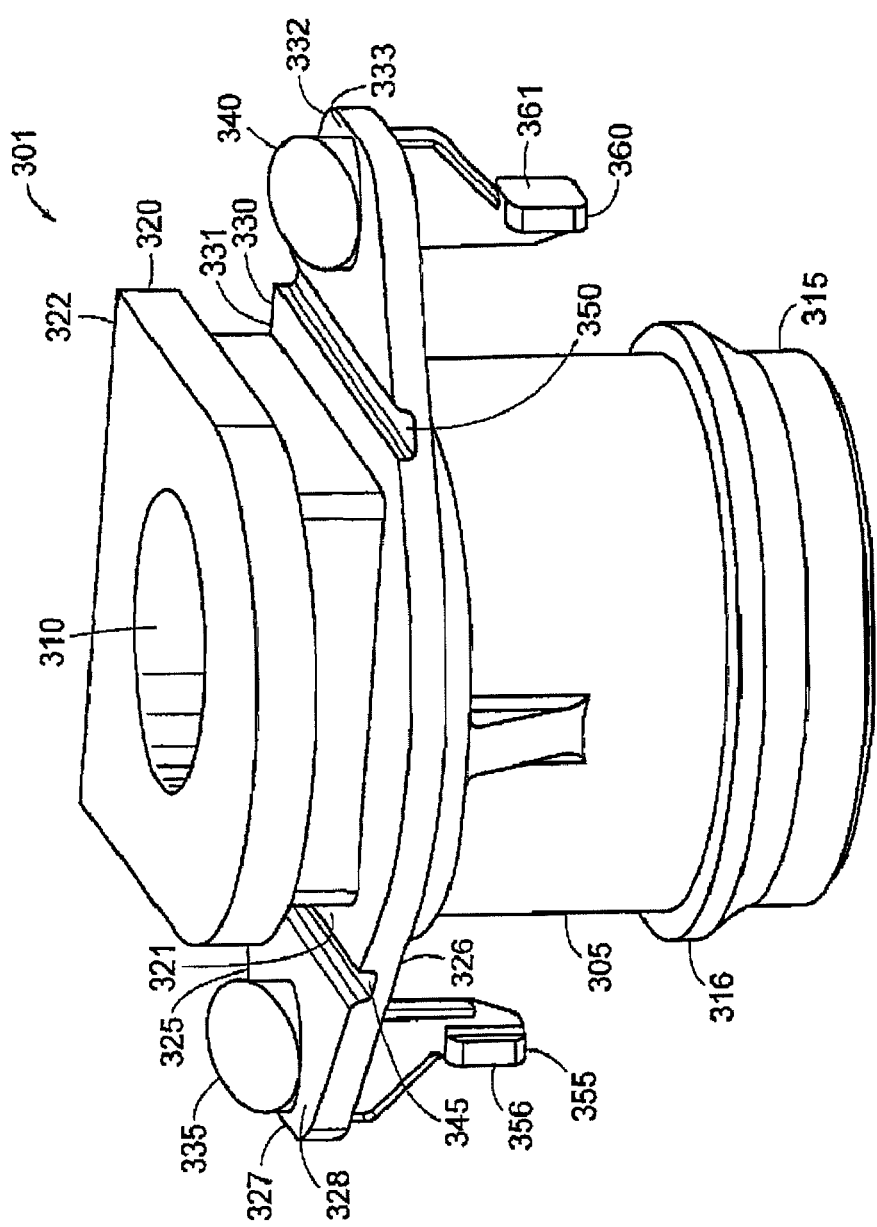
FIG. 3 is a perspective view of a fitting in accordance with certain embodiments of the present disclosure.

FIG. 3 shows an exemplary embodiment of a terminal connector or fitting 301 for a terminal connector assembly. As noted above, the terms "terminal connector" and "terminal fitting" and "fitting" and the like are used herein interchangeably. In the embodiment of FIG. 3, fitting 301 for a terminal connector assembly comprises an elongate body 305 having a longitudinal bore 310 disposed therethrough, a free end 315 and an abutment end 320. First arm 325 and second arm 330 are unitary with and extend from the elongate body 305 alone a plane, and each arm has a proximal end 326, 331, respectively, and a distal end 327, 332, respectively. A first projection 335 and a second projection 340 are each adapted to be received in a corresponding aperture in a bracket (not shown) and each projection projects from a surface 328, 333 of the first arm or second arm, respectively. First groove 345 and second groove 350 disposed in and extending across the first arm 325 and the second arm 330, respectively. Such grooves advantageously facilitate movement of the respective arm relative to the longitudinal axis of the longitudinal bore. The fitting further comprises a first tab member 355 and a second tab member 360, extending from the distal end of the first arm and the second arm, respectively, in a direction offset from the plane of the respective arm. Each such tab member facilitates movement of its respective arm relative to the longitudinal axis of the bore.

Suitable materials for each of the components of the terminal connectors, terminal connector assemblies and cable assemblies disclosed here will be apparent to those skilled in the art given the benefit of the present disclosure. For example, suitable materials for the elongate body 305 and other components include polymers, such as polyesters, polyamides, thermoplastics, etc. In certain embodiments, for example, elongate body 305 and/or other components are made of Nylon 6-6. Optionally the elongate body and/or other components are formed of reinforced plastic, e.g., by plastic material comprising filler, e.g., glass fiber, etc.

As noted above, the elongate body of the terminal connector has a bore disposed therein, which typically extends along the longitudinal axis or the elongate body. In certain exemplary embodiments the bore is a central bore. Typically, the bore is a through-bore, which extends the entire length of the elongate body, and has a cylindrical shape, such that a cross-section of the bore perpendicular to its longitudinal axis will have a circular shape. The diameter of such central bore is generally larger than the outer diameter of a conduit used in the associated terminal connector assembly, which is discussed further below in reference to FIGS. 5-9. The shape of the bore, however, can vary depending on the intended use of the terminal connector. For example, the bore can be rectangular, cubical, pyramidal, etc. Suitable shapes of the bore will be readily apparent to those of skill in the art given the benefit of the present disclosure and the requirements of the intended use of the terminal connector. In the embodiment of FIG. 3, the bore 310 has a longitudinal axis extending between free end 315 and abutment end 320 of elongate body 305. The abutment end 320 is configured to be received in a mounting fixture or bracket, which in turn, is typically mounted to or part of a fixed structure, such as, e.g., a transmission shifter base, a transmission assembly, etc. The free end 315 of the elongate body generally is not directly mounted to such a mounting fixture or bracket. The free end 315 generally is adapted to mate with other components of a terminal connector assembly. In the embodiment of FIG. 3 the free end comprises an annular projection 316 extending around its perimeter, which in certain embodiments is configured to form a snap fit with a cover. As discussed further below, the abutment end has a recess or slot 321 configured to be integral with or be slidingly received in a mounting fixture or base. More specifically, the slot 321 is located in a space between the arm(s) 325, 330 and a retaining member 322.

The terminal connectors disclosed here have at least one arm unitary with and extending from the elongate body. In certain embodiments, two or more arms extend from the elongate body. Each arm has a proximal end, i.e., the portion of the arm closest to the elongate body, and a distal end, i.e., the portion of the arm furthest away from the elongate body. In addition, each arm extends from the elongate body in a plane. That is, each arm lies generally in a plane, although not necessarily in the same plane as another arm of the reminal connector. In certain exemplary embodiments each arm extends from the elongate body linearly, i.e., generally as a straight arm, however, it is also possible for the arm(s) to be curved. For instance, the arm(s) in certain exemplary embodiments can be hooked, bent, etc.

In certain embodiments, the arm(s) extends from the elongate body in a direction approximately perpendicular to the longitudinal axis of the elongate bore. For example, the arm(s) can extend from the elongate body in a direction 90° offset from the longitudinal axis of the elongate body. In certain embodiments where more than one arm extends from the elongate body, the arms can extend in opposite directions from each other relative to the elongate body. In certain embodiments where two arms extend from the elongate body, both arms can extend from the elongate body in opposite directions relative to the elongate body and in a direction approximately perpendicular to the longitudinal axis of the elongate body. The number of arms extending from the elongate body and their relative configuration and shape can vary depending in part on the particular application intended for the terminal connector. As such, a suitable number of arms and their relative configuration and shape will be readily apparent to those of skill in the art given the benefit of this disclosure.

In certain embodiments, the terminal connectors disclosed here comprise an arm having a groove extending across the proximal end of the arm. In certain embodiments where more than one arm is present, the additional arm(s) can also have a groove extending across the proximal end of the additional arm(s). The groove extending across the proximal end of the arm(s) is generally disposed in the arm, as seen, for example, in FIG. 3. Thus, the groove is differentiated from, for example, a mere space present between an elongate body and a J-shaped arm extending from a body insofar as a groove is characterized by an arm having a varying thickness, wherein the arm is less thick where the groove is disposed relative to other portions of the arm, i.e., at its grooved portion. In that regard, the grooved portion, alternatively referred to here as a flexing zone, facilitates flexure of the arm relative to the longitudinal axis of the bore.

As mentioned above, the groove facilitates flexure of the arm relative to the longitudinal axis of the bore. Such enhanced flexability allows the arm to more easily move or bend relative to the longitudinal axis of the bore in order to assist insertion and/or extraction of the terminal fitting in a mounting fixture or bracket. An arm having a groove is generally bent at the location of the arm where the groove is disposed, which is referred to here as the grooved portion or flexing zone. In that regard, the depth of the groove and accordingly the thickness of the arm at the grooved portion can be adjusted to control the amount of force that is required to move or bend the arm. The groove is generally sufficiently deep to facilitate flexure of the arm relative to the longitudinal axis of the elongate body. As used here, the phrase "sufficiently deep to facilitate movement of the arm" means that the groove has any depth in the arm itself that enables the arm in certain exemplary embodiments to flex relative to the longitudinal axis of bore sufficiently to act as a fulcrum. Thus, the dimentions of the groove in such exemplary embodiments, together with the native flexibility of the arm, controls or determines the amount of installation loads and/or extraction loads required, i.e., the force required to insert and remove the fitting from a mounting fixture or bracket. In general, the depth of the groove is indirectly proportional to the installation loads and/or extraction loads. Thus, in embodiments where the depth of the groove is relatively small, i.e., the groove is relatively shallow, the installation loads and extraction loads are greater due to the relatively lower flexibility of the arm. Alternatively, in embodiments where the depth of the groove is larger but that are otherwise the same, i.e., the groove is relatively deeper, the installation loads and extraction loads are lower due to the relatively greater flexibility of the arm. In certain exemplary embodiments wherein the terminal connector is adapted for use in a remote control cable assembly for a transmission in a motor vehicle, a typical arm may have cross-sectional dimensions, i.e., thickness of about 1.0 mm to 2.5 mm and a groove having a depth of about 25% to 75% of the thickness of the arm, more typically 30% to 70%, e.g. about 50%. Thus, if the arm has a thickness of 1.0 mm and the groove depth is 30% of the thickness of the arm, then the groove depth is 0.3 mm. The groove can have any suitable shape, that is, the cross-sectional configuration of the groove may have any suitable shape or configuration. For example, cross-sectional configuration of the groove can be semi-circular, elliptical, rectangular, square, triangular, trapezoidal, etc. In certain embodiments, the groove has a rectangular shape as seen in the embodiment of FIG. 1. Suitable depths and shapes of grooves for the intended application of the terminal connectors will be apparent to those of skill in the art given the benefit of this disclosure.

Figure 10:
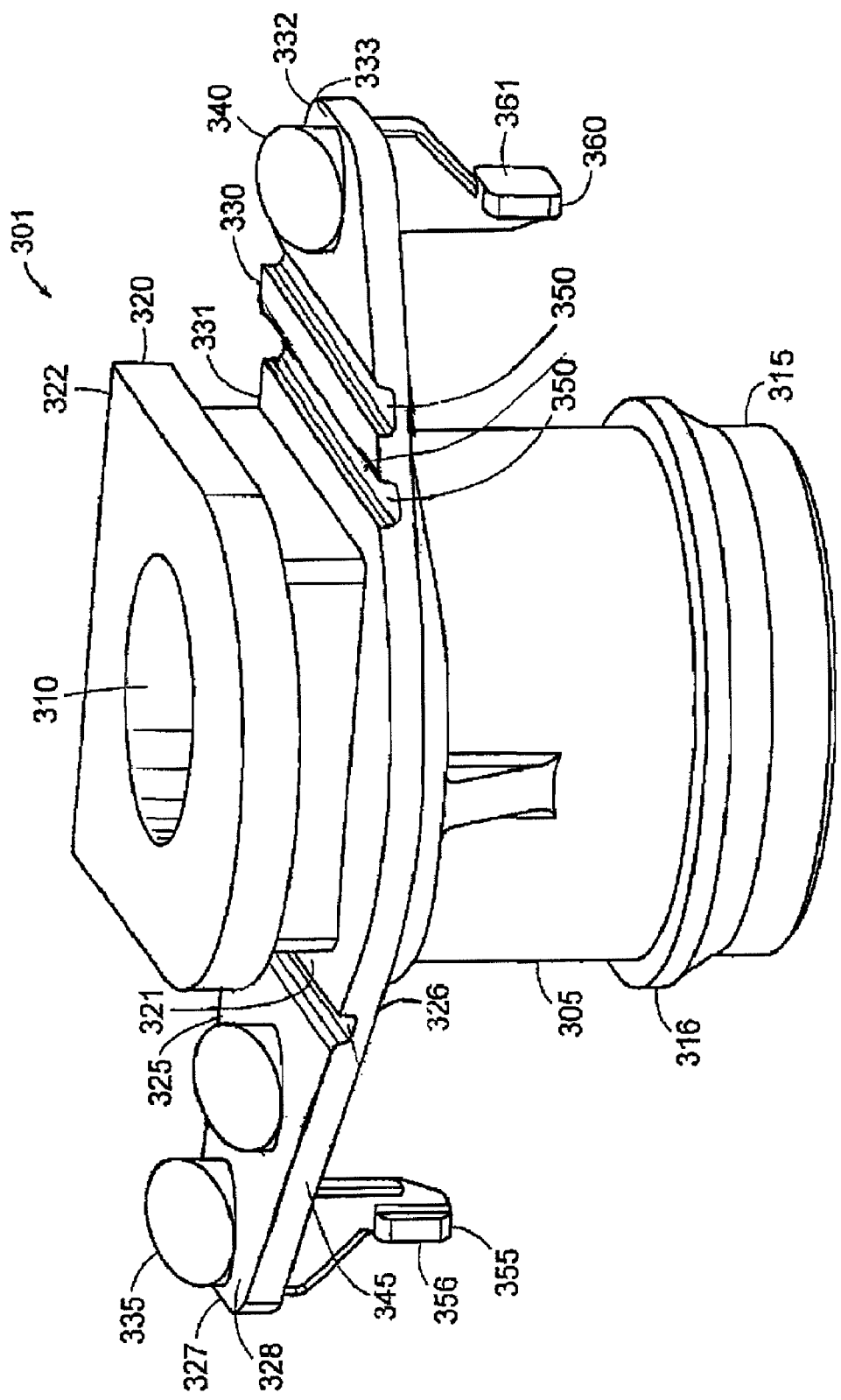
FIG. 10 is a perspective view of a fitting in accordance with certain embodiments of the present disclosure.

In embodiments where the elongate body has more than one arm and each arm has a groove, the shape and depth of the groove in the first arm need not be the same as the shape and depth of the groove in the second arm. In certain exemplary embodiments, as best shown in FIG. 10, more than one groove is disposed in a single arm. The number of grooves per arm can vary depending on the particular application of the fitting. Thus, two or more grooves can extend across a single arm. It will be apparent to those of skill in the art given the benefit of this disclosure that the number and spacing and relative dimensions of the groove(s) will affect the above-mentioned insertion loads and extraction loads. It should be recognized that not every groove need extend entirely across the arm. Preferably, at least one groove extends entirely across the arm in order to provide good flexibility. For a particular intended application of a terminal connector, suitable arrangement of the groove(s) in an arm will be apparent to those skilled in the art given the benefit of this disclosure.

With continuing reference to FIG. 3, the terminal connector or fitting 301 has a first tab member 355 extending from the distal end 327 of the first arm 325 in a direction offset from the plane of the arm. The first tab member is configured to facilitate flexure of the first arm relative to the longitudinal axis of the bore. That is, the tab is positioned to assist in the installation (and removal) of the terminal connector from a mounting fixture by assisting an installer in flexing the arm. In general, the tab member can have a variety of shapes and orientations, but typically the tab member extends from the arm in a direction that is not parallel to the arm. In certain embodiments, such as the embodiment illustrated in FIG. 3, the tab members 355, 360 have externally facing flat projections 356, 361 that are configured to be accessed and used by a human hand, a tool, etc. The tab member 355 is configured to facilitate movement of the first arm 325, preferably by serving as a lever upon which a force can be applied. Such application of force to the tab member results in flexure or bending of the arm. If a groove is present in the arm, the arm typically bend primarily at the groove. In certain exemplary embodiments not having a groove in the arm, the arm generally will bend primarily at the proximal end of the arm. Similarly, second tab member 360 extends from the distal end 332 of the second arm 330 in a direction offset from the plane of the second arm. The second tab member 360 is configured to facilitate flexure of the second arm 330 relative to the longitudinal axis of the bore. Positioning of the tab members on their respective arms can widely vary depending on the intended use of the terminal connector. More specifically, in certain exemplary embodiments where the tab members function primarily as a lever to facilitate flexure of the arms relative to the longitudinal axis of the bore, the ease and degree of bending of the arms can be controlled in part by the configuration and orientation (including positioning) of the tab members on their respective arms. For example, when the tab member extends from the distal end of the arm, the arm from which the tab member extends can be bent to a higher degree or with less torque than if the tab member extends from the proximal end of the arm. In essence then, the anchor point, i.e., the location where the tab member joins the arm, can be selected to achieve the desired amount of bending or torque of the arm. In certain embodiments, the tab member extends from the distal end of the arm to keep insertion and extraction loads to a minimum. In embodiments where there are two or more arms, each having a tab member present, the tab members can extend from the distal end of their respective arms in substantially the same direction or in different directions. In certain exemplary embodiments the tab members extend from the distal end of their respective arms in a direction parallel to the longitudinal axis of the bore. In certain exemplary embodiments more than one tab member extends from a single arm. Suitable quantity and positioning of the tab members will be readily apparent to those of skill in the art given the benefit of this disclosure.

In certain exemplary embodiments, as illustrated by the embodiment of FIG. 3, the terminal connector or fitting 301 has, in certain embodiments, a raised portion or first projection 335 on a first surface 328 of the first arm 325 and a second projection 340 on a second surface 333 of the second arm 330. For convenience, the surface referred to here as the first surface of the arm is the surface that contacts, abuts, engages, etc. the bracket or other mounting fixture. As seen, for example, in FIG. 5, such projection can be generally adapted to be received in (or to receive) the mounting fixture. Such projection preferably is adapted to be received in a corresponding aperture in the mounting fixture. In certain embodiments, the mounting fixture has an aperture configured to receive a projection extending from the surface of an arm of the terminal connector, as well as a slot configured to engage the abutment end of the terminal connector. As noted above, the terms "mounting fixture," "bracket" and "base" are used herein interchangeably.

Figure 4:
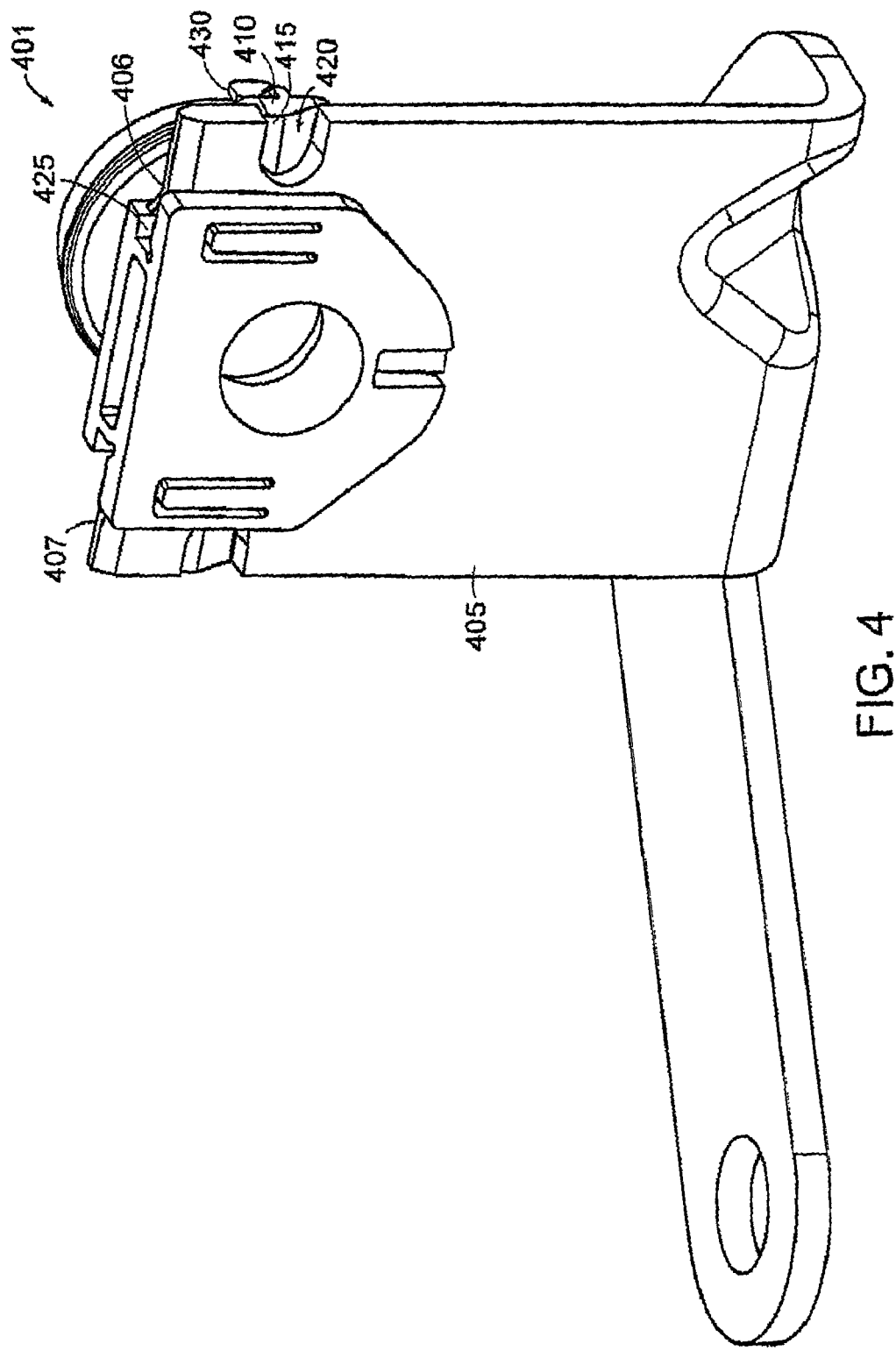
FIG. 4 is a perspective view of a fitting in accordance with certain embodiments of the present disclosure, wherein the fitting is engaged with a typical mounting fixture or bracket.

FIG. 4 shows an embodiment of a terminal connector according to the present disclosure slidably engaged with a mounting fixture. Specifically, terminal connector 401 has an arm 410 with a projection 415 raised thereon that is configured to be slidably received in aperture 420 of mounting fixture 405. Where such projection is received in an aperture of the mounting fixture, the terminal connector is said to be in an engaged position or condition. The base 405 has engaging surfaces 406, 407 along each edge of a slot, that engage the groove(s) disposed in the arm(s) of the terminal connector. Thus, the engaging surfaces 406, 407 provide a surface that facilitates the engagement of the terminal connector with the bracket. In such engaged position, extraction of the terminal connector 401 from the mounting fixture 405 may be difficult without damaging the terminal connector or, alternatively, displacing or removing the projection 415 from the aperture 420. Removing projection 415 from the aperture 420 of the mounting fixture is accomplished by flexing the corresponding arm 410 away from the mounting fixture 405, which is facilitated by the corresponding groove 425 and tab member 430.

In certain embodiments, the projection is beveled, as seen, for example, in FIG. 3, to permit easy insertion of the terminal connector into the mounting fixture, while at the same time preventing facile removal of the terminal connector from the mounting fixture. Beveling the projection is just one exemplary method for achieving ease of insertion of the terminal connector into the mounting fixture. The same objective can be achieved, for example, by employing a dome-shaped projection. In other embodiments the projection is oval, elliptical, or circular. In alternative embodiments, the projection is rectangular, as seen in, for example, FIG. 4. Other suitable shapes for the projection include trapezoidal, square, triangular, etc. Other suitable shapes for the projection will be readily apparent to those of skill in the art given the benefit of this disclosure.

The position, orientation and size of a projection extending from an arm of a terminal connector in accordance with the present disclosure can vary and will depend in part on the intended application of the terminal connector. In certain exemplary embodiments the projection is positioned at the proximal end of the arm, the distal end of the arm, or any position in between. Those of skill in the art given the benefit of this disclosure will recognize that when a projection is positioned at the distal end of an arm, rather than the proximal end, removal of the projection from its corresponding aperture in the mounting fixture is more facile. The projections are generally sufficiently large or small to achieve their intended purpose as described here. In certain embodiments the projection is sized such that the projection will not break off the arm from which it extends when a force of is applied sufficient to install or remove it from a mounting fixture. The projection can be formed as a unitary extension of the arm, such that it can be formed in the same mold with the arm. That is, the arm and the projection from the arm can be a unitary or one-piece structure. In certain embodiments the elongate body and all arms extending therefrom and all projections from such arms are collectively unitary, i.e., together form a single one-piece body. In certain embodiments, a single projection is present on each arm. Alternatively, it is desirable in certain exemplary embodiments, depending upon the specific application intended for the terminal connector and as best shown in FIG. 10, to have more than one projection raised on any one arm of the terminal connector. In such embodiments the projections on a single arm need not have the same shape and/or dimensions. For example, in an arm having more than one projection, each projection can be similarly beveled or differently beveled. Similarly, when more than one arm extends from the elongate body, each arm may have more than one projection. In such embodiments, the projection(s) present on one arm need not have the same shape or be positioned identically with the projection(s) present on another second arm. The number, shape, and positioning of the projections on the arm(s) generally corresponds to the number, shape, and positioning of the corresponding apertures in the mounting fixture. Various suitable alternative embodiments with respect to the number, shape, and positioning of projections on the arm(s) of the terminal connectors will be readily apparent to those of skill in the art given the benefit of this disclosure.

Figure 5A:
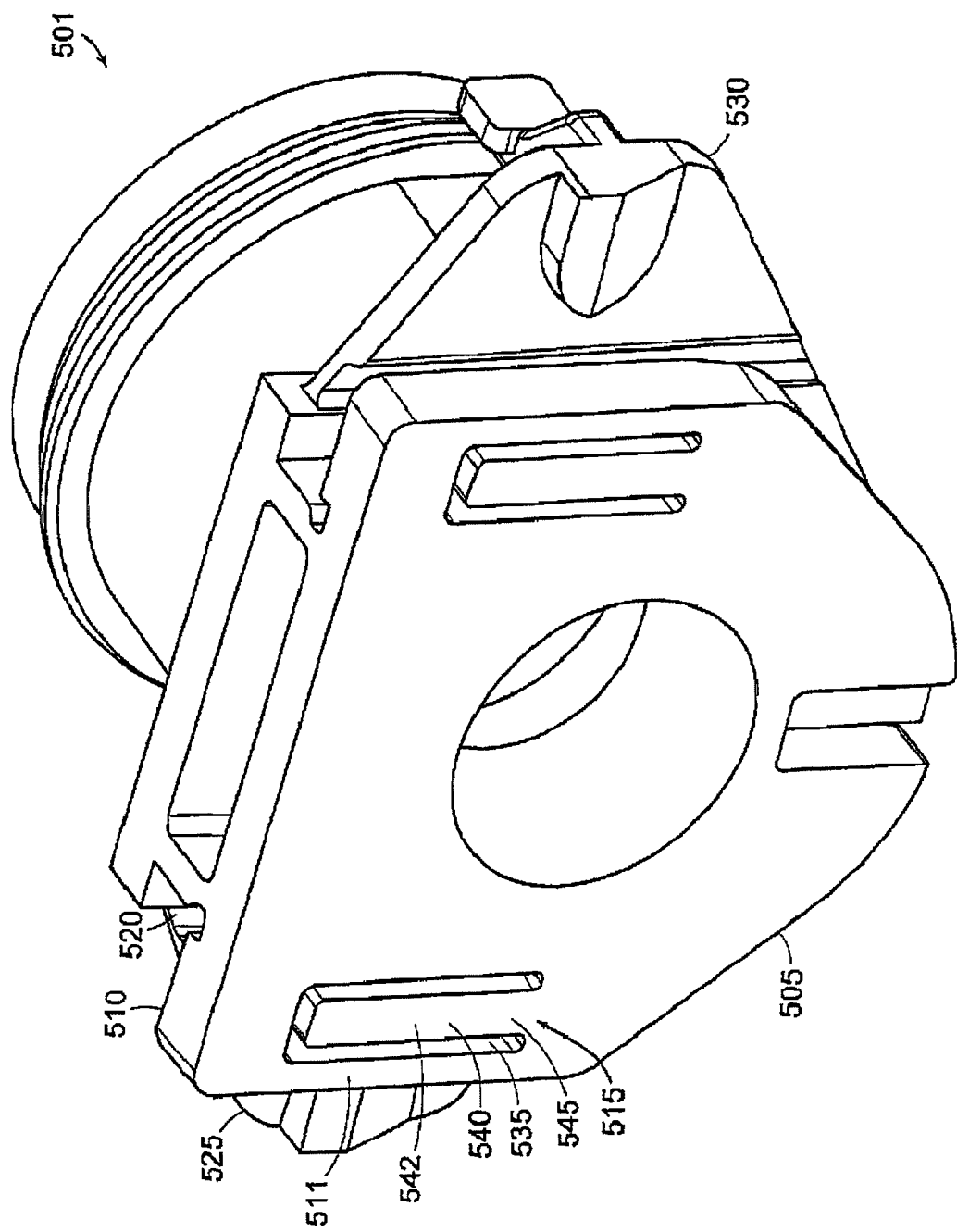
FIG. 5a is a perspective view of a fitting in accordance with certain embodiments of the present disclosure.
Figure 5B:
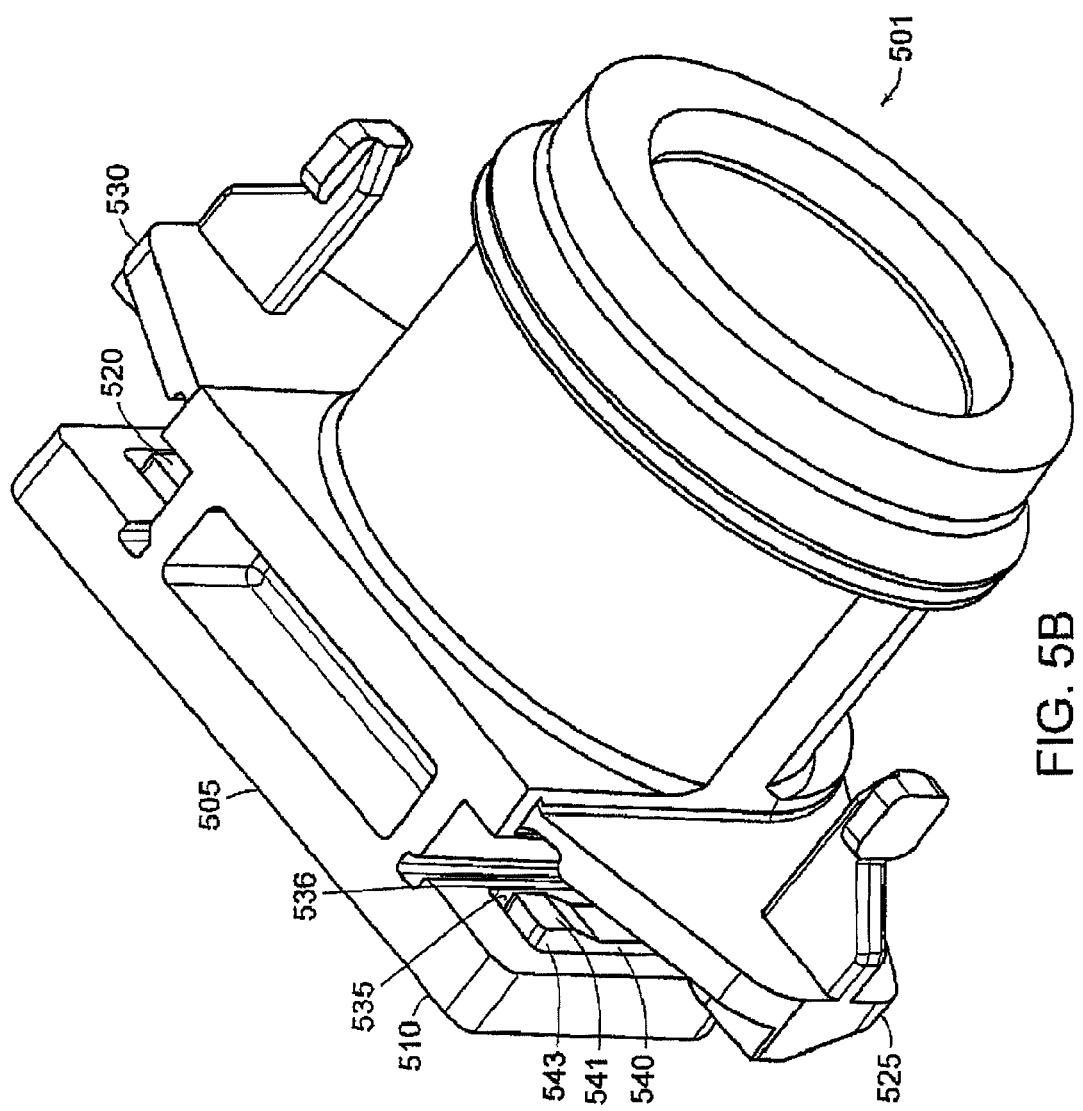

FIGS. 5a and 5b shows certain embodiments of a fitting 501 having an abutment end 505 with a retaining member 510 that comprises an adjuster assembly 515, which allows the fitting to accommodate brackets of different thicknesses. The ability of a fitting to slidingly engage or receive a bracket is limited to the dimensions of the slot 520 of the fitting and/or the slot of the bracket (not shown) since the bracket mates with the slot 520 disposed between the arms 525, 530 and the abutment end 505. The adjuster assembly 515 provides a mechanism that accommodates, retains, or biases a bracket against the arms 525, 530. As such, the adjuster assembly 515 allows the retaining member 510 to abut brackets having various thicknesses due to manufacturing variances, etc. Thus, the adjuster assembly can, at least in certain embodiments, reduce lash typically associated with previous push-pull cable assemblies.

Adjuster assembly 515 has an aperture 535 disposed in the abutment end 505. A retaining member 510 and a flexible projection 540 are disposed in the aperture 535. The flexible projection 540 has an interior surface 541 which faces the arms 525, 530 of the fitting and an exterior surface 542 which is opposite the interior surface. Typically, the flexible projection 540 substantially fills the aperture 535 in the abutment end or retaining member. As used here, the phrase "substantially fills the aperture" means a little or no excess space or void present between an exterior edge of a flexible projection and an interior edge of an aperture wall facing the flexible projection. For example, in FIG. 5b the volume of space between the exterior edge 543 of the flexible projection and the aperture wall 536 facing the flexible projection is relatively small compared to the volume of space occupied by the flexible projection 540. As shown in FIG. 5a, the exterior surface 542 of the flexible projection is generally flush with a surface 511 of the retaining member 510. In contrast, the interior surface 541 of the flexible projection is generally beveled, as seen in FIG. 5b. The thickest portion of a beveled interior surface of a flexible projection is typically at the point furthest from the intersection 545 where the flexible projection is mounted to the retaining member. The thinnest portion of the beveled interior surface of a flexible projection is typically at the point closest to the intersection 545 where the flexible projection is mounted to the retaining member. The flexible projection has a beveled interior surface 541 configured to accommodate a portion of a base or bracket disposed in the recess.

The flexible projection is flexible relative to the retaining member and flexes at the intersection where the flexible projection is mounted to the retaining member. For example, the flexible projection is capable of bending in a direction away from the arms. Such bending generally occurs when a bracket having a thickness at or near that of the slot 520 is inserted into the slot 520. The flexible projection is also able to bend in more than one direction. For example, in addition to being able to bend away from the arms, the flexible projection can also, at least in certain embodiments, bend toward the arms. Accordingly, when a bracket is inserted into a slot between a retaining member and arm(s), the bracket can push against an interior beveled surface of a flexible projection thereby forcing the exterior surface of the flexible projection out of alignment with the retaining member. In this condition, the exterior surface of the flexible projection would no longer be flush with the retaining member. When a bracket exhibits a force against a flexible projection, the flexible projection also exhibits a counterforce against the bracket. Accordingly, the flexible projection generally not only accommodates the bracket, but also (at least partially) reduces axial movement of the bracket in the fitting, thereby potentially reducing lash in a remote control cable assembly, such as a push-pull cable assembly.

Adjuster assemblies suitable for use with the presently disclosed terminal connectors can have a variety of shapes and sizes. For example, the flexible projection, and the corresponding aperture in the retaining member can be rectangular, for example, as in the case of embodiments according to FIGS. 5a and 5b. Alternatively, the flexible projection and the corresponding aperture can also be circular, elliptical, square, parabolic, etc. In addition, the flexible projection need not be the same shape as the corresponding aperture in the retaining member as long as the flexible projection fits inside of the aperture. For example, a circular flexible projection can, at least in certain embodiments, have a corresponding square aperture, if the square aperture is large enough to accommodate the circular flexible projection. Further, the number of adjuster assemblies used in a particular terminal connector will vary in accordance with the intended use of the terminal connector. The shape, number, positioning, etc. of the adjuster assemblies disclosed here will be readily apparent to those of skill in the art given the benefit of the present disclosure.

Figure 6:
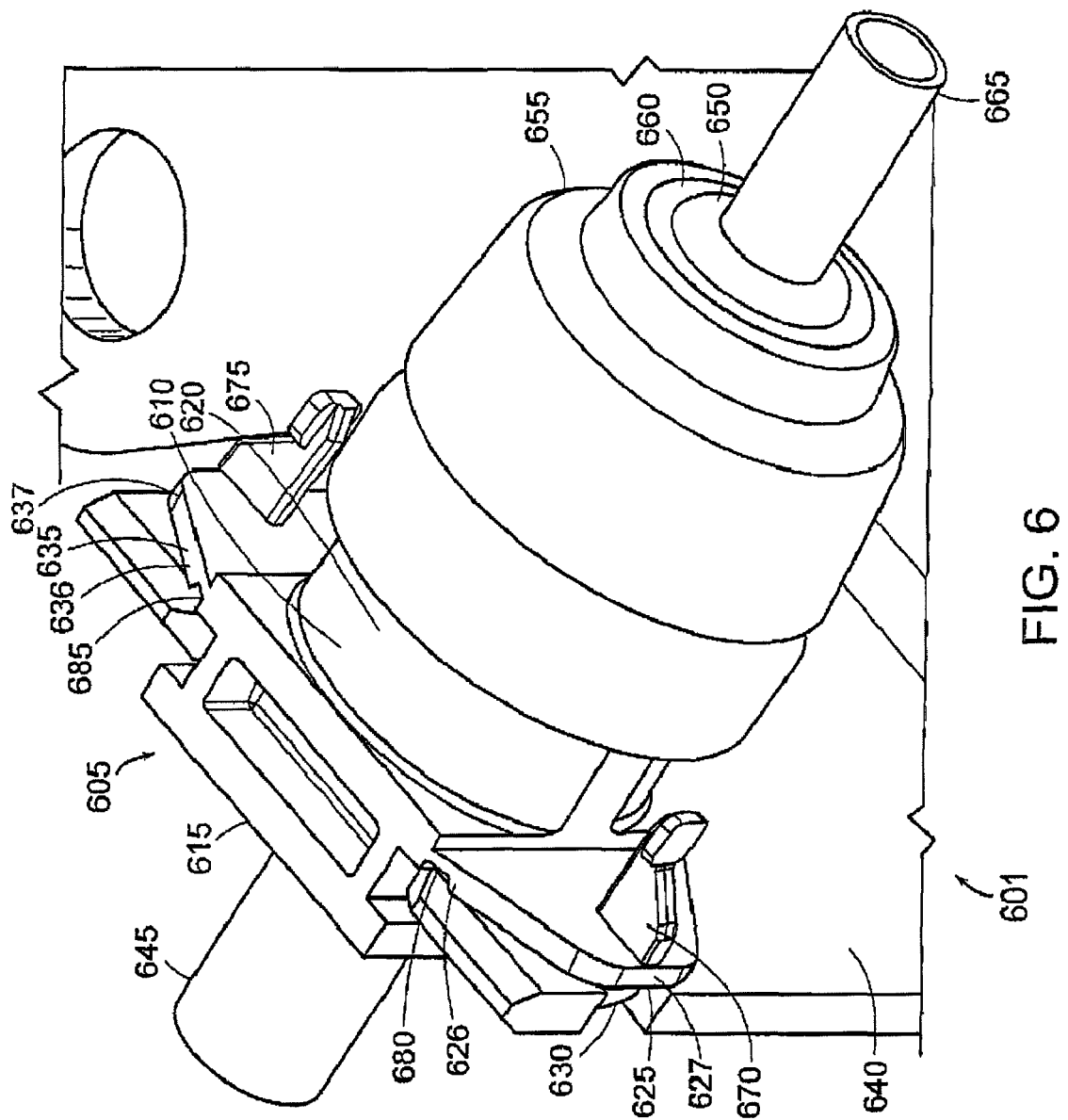
FIG. 6 is a perspective view of a terminal connector assembly having a fitting in accordance with certain embodiments of the present disclosure.

The terminal connectors disclosed here are configured to be assembled to or to integrate with other components to form a terminal connector assembly. Referring now to FIG. 6, a terminal connector assembly 601 is shown to comprise a terminal connector or fitting 605 comprising an elongate body 610 having a longitudinal bore disposed therethrough between an abutment end 615 and a free end 620. A first arm 625 has a proximal end 626 and a distal end 627 and is unitary with and extends from the elongate body in a plane and having a first projection 630 protruding from a surface of the first arm 625. A second arm 635 has a proximal end 636 and a distal end 637 and is unitary with and extends from the elongate body in a plane and has a second projection (not shown) protruding from a surface of the second arm 635. The first projection and the second projection each is configured to be received in a corresponding aperture in a base 640. As further seen in FIG. 6, a swivel tube 645 has an end and a cable receiving bore, the end extending into the abutment end of the fitting. A molded sleeve 650 extends at least partially into the free end 620 of the fitting. A cover 655 is shown mounted to the free end 620 of the fitting where it longitudinally captures the molded sleeve 650 and an isolator material 660 to the fitting. In addition, a conduit 665 is seen to be engaged with the molded sleeve 650. The terminal connector 605 of terminal connector assembly 601 further has a first tab member 670 extending from the distal end 627 of the first arm in a direction offset from the plane of the first arm. That is, the first tab member 670 extends from the first arm in a direction that is not parallel with the first arm. The interior angle between the first arm and the first tab member is about 90°. In other exemplary embodiemtns, the interior angle between the first arm and the first tab member can range from a value approaching 0° to a value approaching 180°. The fitting 605 further comprises a second tab member 675 extending from the distal end 637 of the second arm 635 in a direction offset from the plane of the second arm. As discussed above, the tab members are configured to facilitate flexure of their respective arms relative to the longitudinal axis of the bore. Suitable positions for each tab member relative to its respective arm will be readily apparent to those of skill in the art given the benefit of this disclosure.

The proximal end 626 of the first arm 625 has a first groove 680 disposed in and extending across the first arm 625 and a second groove 685 disposed in an extending across the second arm 635, wherein the first groove 680 and the second groove 685 facilitate flexure of the first arm and the second arm, respectively, relative to the longitudinal axis of the bore. It should be understood that in alternative embodiments of terminal connector assemblies in accordance with this disclosure, the various features of the fitting (e.g., grooves, tab members, projections, additional arms, adjuster assemblies, etc.) can be used alone or in combination with any or all others of these features and other features. As further seen in FIG. 6, the terminal connector assembly 601 can be secured to a base 640 via terminal connector 605. The base 640 is typically mounted in a fixed location, e.g., a transmission shifter base.

Figure 7:
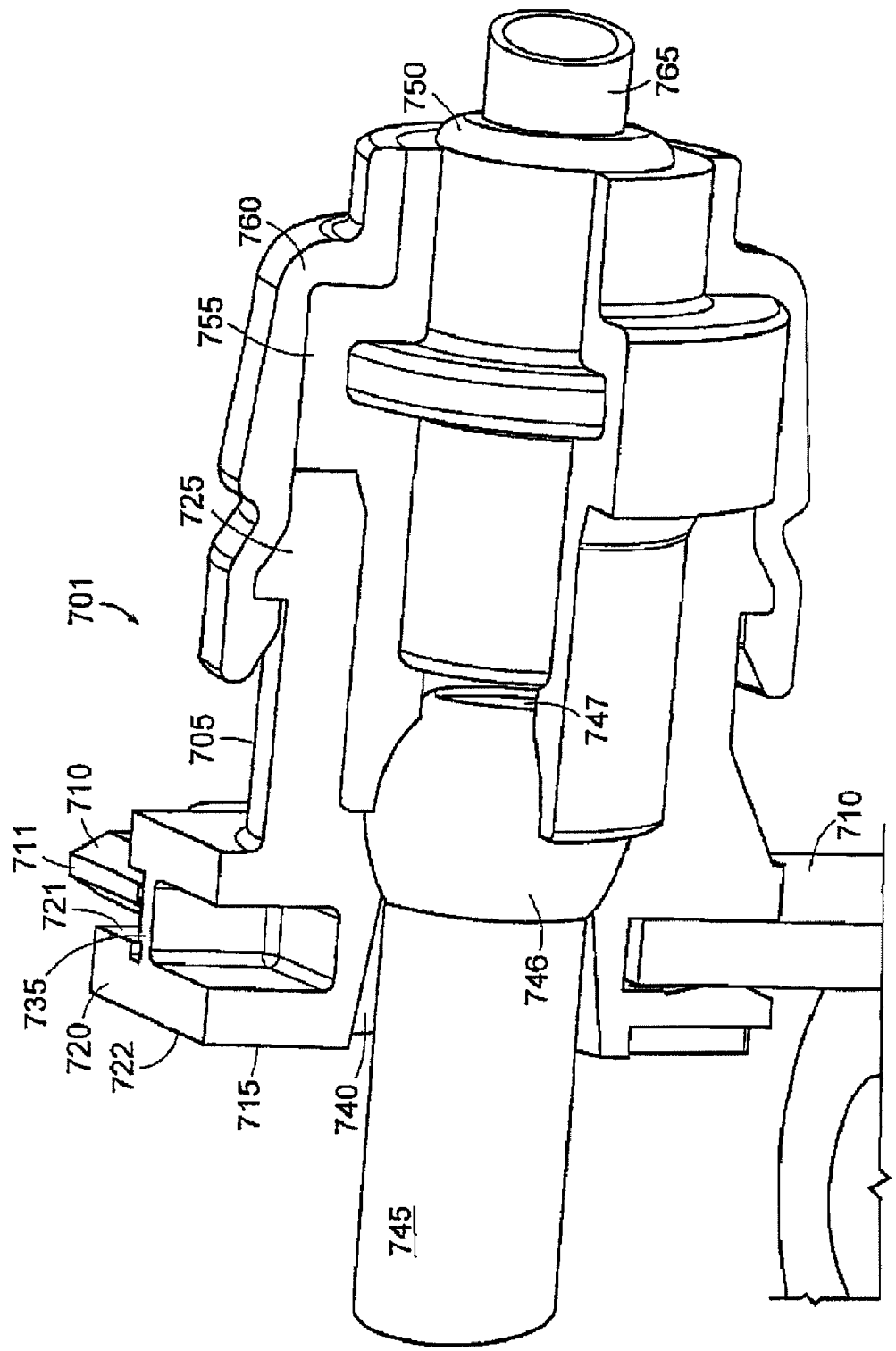
FIG. 7 is a cutaway view of a fitting having a terminal connector in accordance with certain embodiments of the present disclosure.

FIG. 7 shows terminal connector assembly 701 comprising fitting 705 engaged with a bracket or base 710 at its abutment end 715. More specifically, the fitting 705 is shown to have an abutment end 715 having a retaining member 720 extending laterally from the elongate body. The retaining member 720 has an interior surface 721 which is configured to abut a bracket 710. The retaining member 720 additionally has an exterior surface 722, which is opposite the interior surface 721. The retaining member 720 generally minimizes or prevents axial movement of the fitting 705 with the bracket 710 by sandwiching the bracket 710, more specifically an axial protrusion 711, between the retaining member 720 and an arm. In that regard, the arm and the abutment end 715 are connected by a support 735 capable of withstanding axial forces normally encountered by the push-pull cable system in its intended use. Typically, the supports (only one support is shown, the other being substantially the same) are transverse to the arms and the retaining member. The retaining member preferably extends laterally from the elongate body a distance sufficient to prevent axial displacement of the fitting from the bracket 710. Thus, the retaining member 720 in the illustrate embodiment extends a sufficient distance to at least slightly overlap with the bracket. The fitting 705 mates with slot 740 in the bracket 710. Suitable configurations for reducing or minimizing or preventing axial movement between the fitting and the bracket will be apparent to those of skill in the art given the benefit of this disclosure.

Terminal connector assembly 701 in addition to fitting 705, comprises additional components including swivel tube 745 having an end 746 and a cable receiving bore 747, the end extending into the abutment end 715 of the fitting. Also, molded sleeve 750 of the terminal connector assembly extends at least partially into the free end 725 of the fitting. Terminal connector assembly 701 further comprises isolator material 75 and a cover 760 mounted to the free end 725 of the fitting, longitudinally capturing molded sleeve 750 and isolator material 755 to the fitting 705. Conduit 765 extends into the molded sleeve 750.

Figure 8:
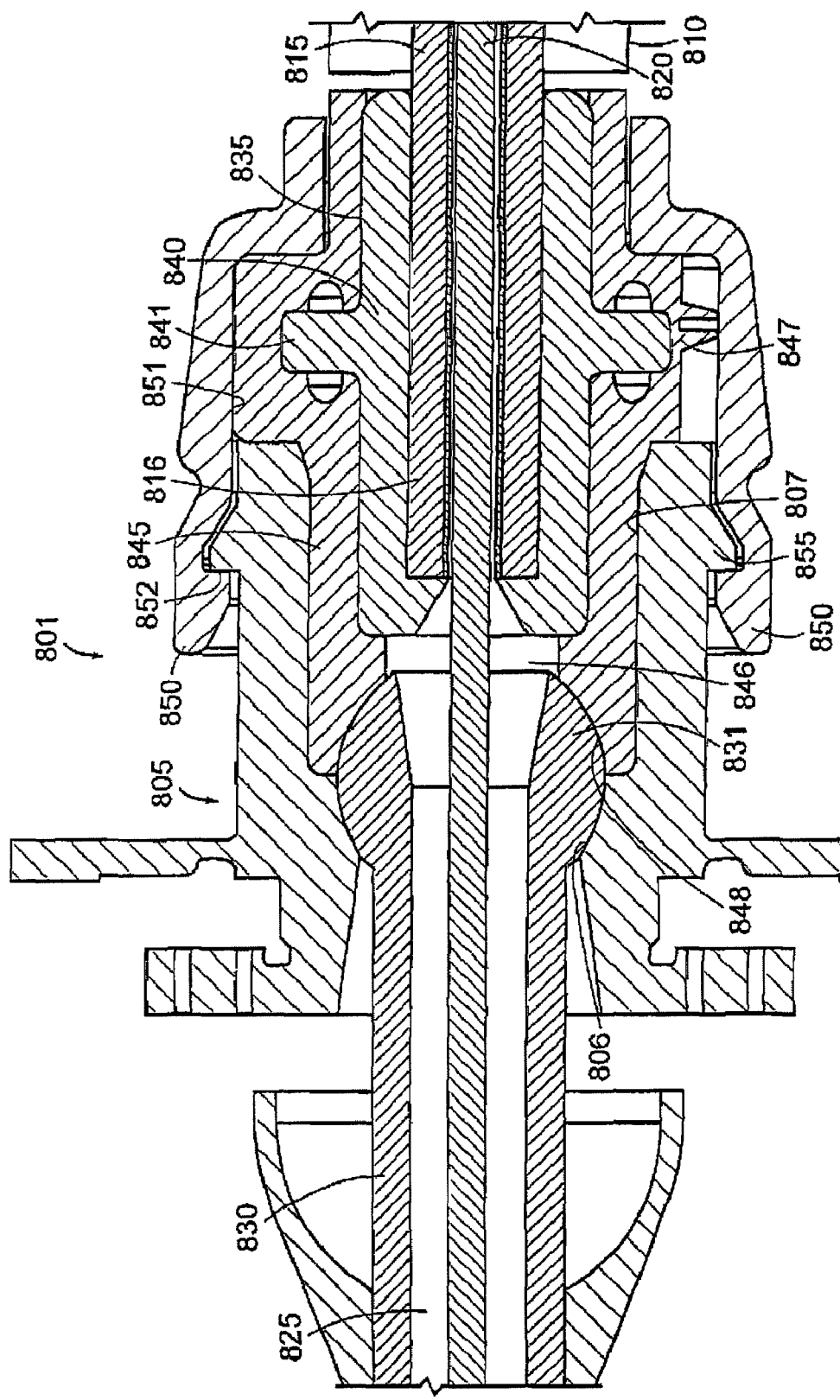
FIG. 8 is a cross-sectional view of a terminal connector assembly having a fitting in accordance with certain embodiments of the present disclosure.

FIG. 8 shows terminal connector assembly 801 having terminal connector 805 and control cable 810. The control cable 810 includes a sleeve containing conduit 815, and a wire-like strand or core element 820. The end of core element 820 is attached to slider rod 825 extending within swivel tube 830. The swivel tube 830 is supported within swivel socket 806 provided in fitting 805, typically the abutment end of the fitting. Terminal connector assembly 801 is also seen to have a molded sleeve subassembly 835 which comprises molded sleeve 840 and conduit 815. Conduit 815 has an end 816 and a longitudinal axis and is configured to receive core element 820 disposed therein. Conduit 815 has a bore from which core element 820 extends into swivel tube 830. The molded sleeve 840 has a bore in which the conduit 815 extends. The molded sleeve can receive the end of the conduit in a variety of ways. For example, the molded sleeve can, at least in certain embodiments, integrate with the conduit by a snap-fit. As such, the molded sleeve and the conduit can be two distinct components. In other embodiments the molded sleeve is molded to the conduit, thereby forming a unitary structure in which the molded sleeve and the conduit are a single component. In the embodiment of FIG. 8 the molded sleeve has a first cylindrical shoulder feature (unnumbered), a radial projection 841 for receiving and retaining a compressible isolator 845 and a second cylindrical shoulder feature (unnumbered) for retaining the molded sleeve 840 within the cover 850. Suitable alternative configurations of the molded sleeve subassembly will be readily apparent to those of skill in the art given the benefit of this disclosure.

The compressible isolator material 845, sometimes referred to here as just the "isolator," is typically formed of a compressible elastomeric material. Besides being compressible, the isolator 845 is, at least in certain embodiments, a resilient material. In certain embodiments, the isolator is made from a soft plastic such as, e.g., thermoplastic elastomer or plastomer. This is to be contrasted with the molded sleeve 840 and the fitting 805, both of which are more typically formed of a hard, noncompressible plastic material. For example, in certain embodiments, the isolator comprises urethane, TPO (santoprene), etc. The molded sleeve 840 can be formed of nylon (e.g., 32% mineral filled Nylon 66) and the fitting 805 and cover 850 can also be formed of the same material. The isolator preferably is able to absorb some or all vibration in the cable assembly that would otherwise be tranmitted. The isolator is generally annular and configured to be received by an isolator socket of the fitting. The isolator typically has a bore configured to receive the molded sleeve and a conduit disposed therein. In certain embodiments, the isolator has a central bore. In the embodiment of FIG. 8 a space 846 exists between the end 831 of the swivel tube and the end of the molded sleeve 840, which provides the terminal connector assembly 801 with a greater opportunity to accommodate dimensional variations, such as manufacturing tolerances stack-up. Isolator 845 includes cylindrical cavity 847 for receiving a cylindrical shoulder of the molded sleeve 840 and has a partial spherical cavity or socket 848 for receiving and supporting the swivel tube 830. In certain embodiments, the isolator is a single unitary piece. In alternative embodiments, the isolator comprises two or more pieces, e.g., pieces that can be connected together and assembled onto the molded sleeve, e.g., by folding the two or more pieces about living hinge(s) and over the shoulder portions of the molded sleeve, whereby the isolator is integral with the molded sleeve. The isolator can, at least in certain embodiments, be unitary with the molded sleeve. In certain embodiments, the molded sleeve and isolator are tapered toward the end of the conduit, which likely facilitates assembly of the molded sleeve and isolator into the fitting, reduces lash by providing a radial reaction component to axial forces, and facilitates compression of the isolator. Additional suitable configurations for the isolator will be apparent to one skilled in the art given the benefit of this disclosure.

The terminal connector optionally has features molded into its outside periphery that are conducive for securing the cover to the free end of the terminal connector. For example, in the embodiment of FIG. 8 the free end has an outer annular ring 855 configured to mate with cover 850. In certain exemplary embodiments the cover and the free end of the fitting form a snap fit with each other. In certain embodiments, the free end can have a lip that mates with the cover to form a snap fit. Suitable configurations for securing the cover to the free end of the fitting will be readily apparent to those of skill in the art given the benefit of this disclosure. The fitting 805 also has a partial spherical socket or cavity 806 for receiving and supporting the swivel tube 830 and has a cylindrical cavity 807 for receiving the front cylindrical portion of the isolator 845 and the molded sleeve 840 of the assembly.

The cover 850 can be formed of any suitable material, e.g., hard plastic, and is seen to include a cylindrical cavity 851 for receiving the rear portion of the isolator 845 and the molded sleeve 840. The cover 850 also includes an internal lip 852 that mates with or is integral with an annular ring on the free end of the fitting 801 to provide a snap fit, however, as discussed above, other configurations, such as an outer lip on a free end of a fitting mating with a corresponding lip or depression on the interior surface of the cover can also be used. In particular, the fitting 801 and cover 850 are snapped together over the top of the assembly created by folding the conduit isolator over the molded sleeve to cap the assembly. In that regard, the cover mounted to the free end of the fitting longitudinally captures the molded sleeve and the isolator material to the fitting.

The isolator, cover, fitting and molded sleeve, are generally dimensioned such that when they are assembled, they have a slight interference. As such, the capturing action compresses the conduit isolator up against both the front and back portions of the first shoulder of the molded sleeve, thus reducing lash generated by the rotational joint. A small amount of lubricant can be applied to the conduit isolator prior to assembly to facilitate the easy rotational movement of the conduit end fitting assembly relative to the axis of the conduit. This may obviate the need for a circumferential anti-stick surface provided contiguous with the isolator or an anti-stick coating on the outer surface of the molded sleeve. Again, the conduit isolator is, at least in certain embodiments, manufactured from a compressible resilient material that helps isolate against transmission of vibration/noise and can be easily compressed by the snap fitting operation.

Figure 9:
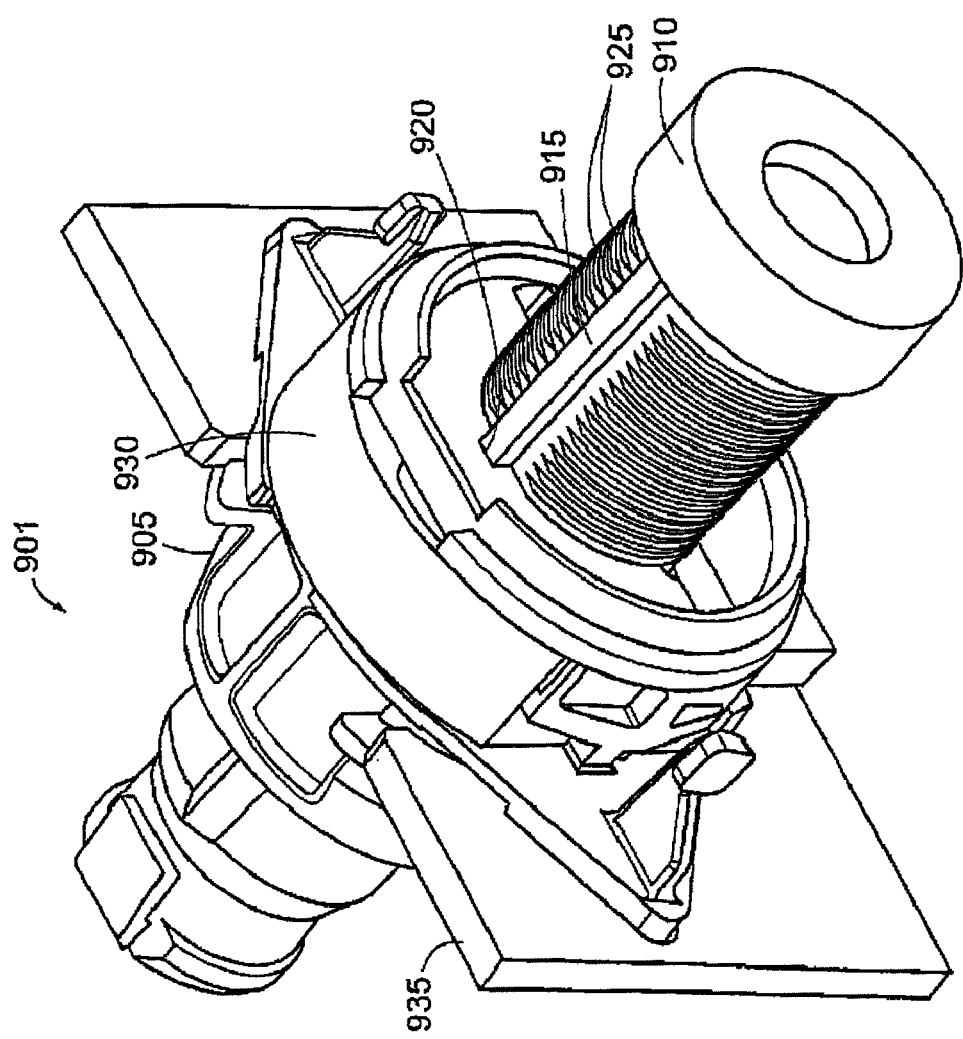
FIG. 9 is a perspective view of a terminal connector assembly shown in accordance with certain embodiments, wherein the terminal connector assembly is adjustable.

FIG. 9 shows terminal connector assembly 901 comprising a fitting 905 mounted to a base 935 and a conduit 910 adapted for axial movement relative to the fitting 905. As such, the terminal connector assembly is adjustable to compensate for slack in, e.g., a remote control cable assembly. More specifically, the conduit 910, which extends into the bore of the free end of the fitting, has axial rib 915 that extends along the longitudinal axis of the conduit. The rib 915 is seen to mate with a correspondingly positioned notch 920 disposed in the interior surface of the free end of the fitting, thereby reducing lateral rotation of the conduit in the fitting. The conduit is further seen to comprise a series of teeth 925 that are configured to engage with a lock 930 that, when engaged with the fitting 905 and the conduit 910, reduces axial movement of the conduit relative to the fitting. Of course, other configurations for an adjustable terminal connector assembly using the above-described fittings will be readily apparent to those of skill in the art given the benefit of this disclosure.

The foregoing disclosure is intended to be illustrative and not limiting. Various features, characteristics and advantages have been set forth in the foregoing description, together with details of the structure and function of certain exemplary embodiments. It should be understood that the features of such various embodiments of the terminal connectors (fittings) terminal connector assemblies and cable assemblies disclosed here can be used alone or in any combination or permutation with one another. For instance, the swivel tube can extend into the free end of the fitting and the conduit can extend into the abutment end of the fitting, and such modifications are within the scope and spirit of the present disclosure. Other embodiments of the terminal connectors, terminal connector assemblies and cable assemblies, including modifications, e.g., modifications to adapt such terminal connectors, terminal connector assemblies and cable assemblies for use in non-motor vehicular applications, are within the scope and spirit of the present disclosure. Other such modifications include, e.g., changes in function, intended use, shape, size and arrangement of parts, etc. and are within the principles of the forgoing disclosure to the full extent indicated by the broad general meaning of the terms in the following claims.

What is claimed is:

1. A cable assembly for transmitting force or motion comprising:
    a conduit:
    a flexible core element extending through the conduit;
    an elongate body having an abutment end, a free end, and a longitudinal bore disposed therethrough for accommodating the conduit, a first arm being unitary with and extending from the elongate body in a lateral direction, having a first projection protruding from a surface of the first arm and having a first tab member extending from the first arm in a generally longitudinal direction to a distal end, wherein the first tab member facilitates flexure of the first arm by moving the distal end of the first tab member towards the longitudinal axis of the bore;
    a swivel tube having an end and a flexible core element receiving bore, the end extending into the abutment end of the elongate body;
    a sleeve extending at least partially into the free end of the elongate body;
    an isolator material; and
    a cover mounted to the free end of the elongate body and longitudinally capturing the sleeve and the isolator material to the elongate body.

2. The cable assembly of claim 1, wherein the first projection is beveled.

3. The cable assembly of claim 1, wherein a retaining member extends laterally from the elongate body and has an exterior surface and an adjuster assembly having an aperture disposed in the abutment end and a flexible projection substantially disposed in the aperture, the flexible projection having an exterior surface being substantially flush with the exterior surface of the abutment end.

4. The cable assembly of claim 1 further comprising a first groove disposed in and extending across the first arm, wherein the first groove facilitates flexure of the first arm.

5. The cable assembly of claim 1 further comprising
    a retaining member having an exterior surface and an interior surface and extending laterally from the elongate body and
    a retaining member projection substantially flexibly disposed in an aperture of the retaining member, wherein a first surface of the flexibly disposed retaining member projection lies substantially flush with the exterior surface of the retaining member and a second surface of the flexibly disposed retaining member projection, opposite the first surface, extends laterally beyond the plane of the interior surface.

6. The cable assembly of claim 5, wherein a slot is formed between the first arm and the retaining member such that the first surface of the first arm and the interior surface of the retaining member face each other.

7. The cable assembly of claim 5, wherein the flexible retaining member projection has a beveled second surface.

8. The cable assembly of claim 1 further comprising:
   a second arm extending from the elongate body in a lateral direction and comprising a second projection from a surface of the second arm, and
   a second tab member extending in a generally longitudinal direction from the second arm to a distal end, wherein moving the distal end of the second tab member towards the longitudinal axis of the bore flexes the second arm.

9. The cable assembly of claim 8, wherein the first projection and the second projection are each beveled.

10. The cable assembly of claim 8, wherein the first arm and the second arm extend from the elongate body in opposite directions approximately perpendicular to the longitudinal axis of the bore.

11. The cable assembly of claim 8, wherein the first arm and the second arm each comprises multiple projections.

12. The cable assembly of claim 8 further comprising a first groove disposed in and extending across the first arm and a second groove disposed in and extending across the second arm, wherein the first groove and second groove facilitates flexure of the first arm and the second arm, respectively, relative to the longitudinal axis of the bore.

13. The cable assembly of claim 12, wherein the first groove and the second groove extend across the proximal end of the first arm and the second arm, respectively.

14. The cable assembly of claim 12, wherein at least one of the first arm and the second arm comprises more than one groove disposed therein.

15. The cable assembly of claim 12, wherein at least one of the first groove and the second groove each has a rectangular shape.

16. A terminal connector assembly for a cable assembly for transmitting force or motion comprising:
   a terminal connector comprising an elongate body having an abutment end, a free end, and a longitudinal bore disposed therethrough, a first arm having a proximal end and a distal end and being unitary with and extending from the elongate body in a plane and having a first projection protruding from a surface of the first arm, and a second arm having a proximal end and a distal end and being unitary with and extending from the elongate body in a plane and having a second projection protruding from a surface of the second arm;
   a swivel tube having an end and a flexible core element receiving bore, the end extending into the abutment end of the elongate body;
   a sleeve extending at least partially into the free end of the elongate body;
   an isolator material; and
   a cover mounted to the free end of the elongate body and longitudinally capturing the sleeve and the isolator material to the elongate body,
   wherein the first arm comprises a first tab member extending from the distal end of the first arm in a direction offset from the plane of the first arm and wherein the second arm comprises a second tab member extending from the distal end of the second arm in a direction offset from the plane of the second arm, wherein the first tab member and the second tab member each facilitate flexure of the first arm and the second arm, respectively, when the first tab member and the second tab member are moved toward the longitudinal axis of the bore.

17. A remote control cable assembly for a transmission comprising:
   a shifter end terminal connector assembly comprising a terminal connector comprising an elongate body and having an abutment end, a free end, and a longitudinal bore disposed therethrough, a first arm unitary with and extending from the elongate body in a plane and having a first projection protruding from a surface of the first arm, and a second arm unitary with and extending from the elongate body in a plane and having a second projection protruding from a surface of the second arm, wherein the first arm comprises a first tab member extending from the first arm in a direction offset from the plane of the first arm and wherein the second arm comprises a second tab member extending from the second arm in a direction offset from the plane of the second arm, wherein the first tab member and the second tab member each facilitate flexure of the first arm and the second arm, respectively, when the first tab member and the second tab member are moved toward the longitudinal axis of the bore, a swivel tube having an end and a flexible core element receiving bore, the end extending into the abutment end of the terminal connector, a sleeve extending at least partially into the free end of the terminal connector, an isolator material, and a cover mounted to the free end of the terminal connector and longitudinally capturing the sleeve and the isolator material to the terminal connector;
   a transmission end terminal connector assembly comprising a terminal connector comprising an elongate body and having an abutment end, a free end, and a longitudinal bore disposed therethrough, a first arm unitary with and extending from the elongate body in a plane and having a first projection protruding from a surface of the first arm and a second arm unitary with and extending from the elongate body in a plane and having a second projection protruding from a surface of the second arm, wherein the first arm comprises a first tab member extending from the first arm in a direction offset from the plane of the first arm and wherein the second arm comprises a second tab member extending from the second arm in a direction offset from the plane of the second arm, wherein the first tab member and the second tab member each facilitate flexure of the first arm and the second arm, respectively, when the first tab member and the second tab member are moved toward the longitudinal axis of the bore, a swivel tube having an end and a flexible core element receiving bore, the end extending into the abutment end of the terminal connector, a sleeve extending at least partially into the free end of the terminal connector, an isolator material, and a cover mounted to the free end of the terminal connector and longitudinally capturing the sleeve and the isolator material to the terminal connector; and
   a conduit connecting the shifter end terminal connector assembly and the transmission end terminal connector assembly.

* * * * *